MULTIPLEXING SYSTEM FOR A HIGH SPEED STORAGE DEVICE

Filed Jan. 16, 1969 2 Sheets-Sheet 1

INVENTOR
RAYMOND A. SCHULZ
BY John S. Gasper
ATTORNEY

United States Patent Office
3,566,375
Patented Feb. 23, 1971

3,566,375
MULTIPLEXING SYSTEM FOR A HIGH SPEED STORAGE DEVICE

Raymond A. Schulz, Owego, N.Y., assignor to International Business Machines Corporation, Armonk, N.Y., a corporation of New York Filed Jan. 16, 1969, Ser. No. 791,687
Int. Cl. G11c 7/00, 11/14
U.S. Cl. 340—174 7 Claims

ABSTRACT OF THE DISCLOSURE

A multiplexing system in which a single bit driver and a sense amplifier are connected in common to plural channels of a conductor network. Diode means are provided in the channels to block signal pulses in unselected channels and to protect the sense amplifier from high energy pulses generated by the bit driver when write operations are performed in the memory bit sense lines. The bit-sense lines of the memory device are connected to the various channels by transformer coupling. Voltage switches operated by logic circuitry are connected to the transformer windings to effect the connection of the bit driver and the sense amplifier to the desired memory channel to perform read/write operations in the memory device.

The invention herein described was made in the course of or under a contract with the Department of Defense.

BACKGROUND OF THE INVENTION

Field of the invention

This invention relates to a multiplexing system and, particularly, to a multiplexing system for a high speed data storage device, or the like.

Description of the prior art

In data storage systems, particularly those having large orders of data bits being stored and read out, it is advantageous to be able to minimize the number of circuit components necessary to perform the read/write storage operations. One approach is to multiplex several signal lines into a single operator circuit. For example, in a memory device having a two-dimensional organization, several bit-sense lines could share a common bit driver and a common sense amplifier. Various prior approaches to accomplishing this object, however, have not been completely satisfactory. No advantage is obtained unless the multiplexer is simpler than the circuit operators being replaced. In addition, the multiplexer must also not contribute significant signal degradation which includes attenuation, DC offset and noise. A further requirement is that the multiplexer should take a form which permits maximum circuit integration especially in light of increased demands for greater density and reliability in packaging of electronic data processing units.

SUMMARY OF THE INVENTION

It is the principal object of this invention to provide an improved multiplexing system for a memory device or the like which is highly reliable, operates at high speeds and meets the above started requirements.

It is a further object of this invention to provide an improved multiplexing system for a magnetic memory device which operates at high switching speeds and which can readily be made as part of an integrated circuit package.

It is a further object of this invention to provide an improved multiplexing for a word-organized memory device, particularly of the magnetic film type with two-dimensional organization.

The above, as well as other objects and advantages may be obtained in accordance with this invention by providing a driver circuit and a sense amplifier connected in common to plural channels of a conductor network. Diode means are provided in each of the channels to block signal transmission in unselected channels. Bit-sense lines of the memory device are connected to the multiplexing channels by a transformer means. Voltage switch circuits connected to the windings of the transformer are operated by gate logic means to effect selective connection of the driver circuit and the sense amplifier to the bit-sense lines of the memory device. It is a feature of this invention that the voltage switch circuits are operable in a manner which also delivers high energy to the bit-sense line for write operations and low energy signals when the read operation is performed.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
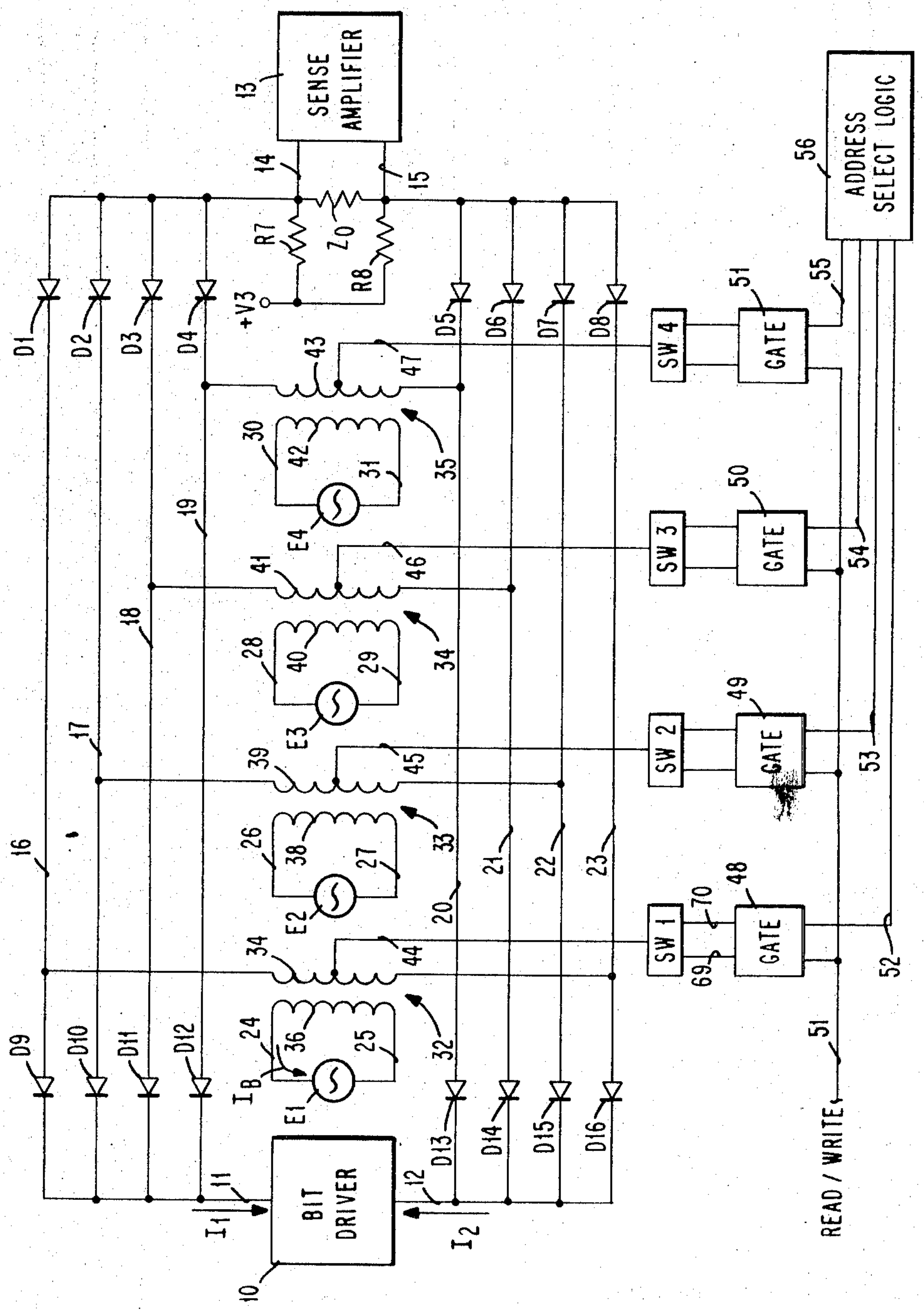
FIG. 1 illustrates a preferred embodiment of a multiplexing system for read/write operations of a two-dimensional memory device according to this invention.

Reference is made to FIG. 1 which shows a simplified form of a memory accessing system whereby a single bit driver 10 and a single sense amplifier 13 are shared for read/write operations at plural channels of plural co-ordinate positions of a memory device. As seen in the drawing the output 11 of the bit driver 10 is connected through parallel multiplex channel conductors 16 through 19 to the input 14 of the sense amplifier 13. The second output 12 of bit driver 10 is connected through channel conductors 20 through 22 to the second input 15 of sense amplifier 13. A characteristic impedance $Z_0$ and source voltage $V_3$ with bias resistors R7 and R8 are also connected to inputs 14 and 15 of sense amplifier 13 in well-known manner, as shown. Bit sense lines 24 through 31 represent the bit-sense lines of a word organized magnetic memory device, preferably of the two-dimensionally organized variety, in which discrete magnetic films form the data bit storage elements of the memory device. While various magnetic or magnetic film elements might be used in practicing this invention, a preferred type of memory array and memory element is illustrated in copending applications of A. W. Vinal, Ser. No. 635,072, filed May 1, 1967 and now U.S. Pat. No. 3,487,372, and Ser. No. 693,409, filed Dec. 26, 1967, and assigned to the same assignee as the present invention. As shown in those copending applications, the memory array comprises magnetic film bits deposited at plural spaced locations on a conductor substrate. In this configuration, the conductor substrate constitutes the word line of the memory device and the bit lines are conductor strips overlaying the magnetic film bits and extending orthogonally to the substrate conductor to allow switching of the magnetic state of the films by coincident energization of the word and bit lines.

In accordance with this invention, the bit sense lines 24 through 31 are coupled to the channel conductors 16 through 23 through transformers 32 through 35. Thus, bit-sense lines 24 and 25 are connected to appropriate ends of the primary winding 36 of transformer 32. Secondary winding 34 of transformer 32 is connected to conductors 16 and 23. Likewise, bit-sense lines 26 and 27 are connected to primary winding 38 of transformer 33 whose secondary winding 39 is connected to conductors 17 and 22. Similarly, it can be seen that bit-sense lines 28 and 29 are connected to primary winding 40 of transformer 34 having its secondary winding 41 connected to conductors 18 and 21, while bit sense lines 30 and 31 are connected to primary winding 42 of transformer 35 with secondary winding 43 connected to conductors 19 and 20.

Memory access, i.e. channel selection, is obtained through a set of voltage switches SW1 through SW4 connected by lines 44–47 to center taps on the secondary windings of the coupling transformers 32–35. Selective operation of the voltage switches SW1–SW4 is provided by gate circuits 48–51 each having one input connected in common by line 51 to a read/write signal input. Lines 52 through 55 connect the second inputs of gates 48–51 to address select logic circuitry 56 of any suitable type.

Memory access or channel selection, is further obtained and controlled by providing blocking diodes D1–D16 connected into the channels with conductors 16–23 in the manner shown. For purposes of ease in description, the diodes D1–D8 are referred to as read diodes and diodes D9–D16 are referred to as write diodes.

When connected as shown, diodes D1–D16 operate to block the transmission of signals in the unselected channels and protect sense amplifier 13 from excess voltage signals generated in the channel conductors 16–23 during write operation.

The technique used for multiplexing to obtain channel selection is done by applying either up level or down level signals to the center taps of the transformers 32 through 35. It is a further characteristic that when voltage switches SW1 through SW4 are in the up level condition, they can also be operated to produce a low power or high power input. The difference between a low power and a high power up level will be further described hereinafter. The following Truth Table shows the conditions for operating the multiplexing system of FIG. 1.

TABLE I

| Inputs | | | |
|---|---|---|---|
| Select | Read/ write | Switch, output voltage | Conditions |
| 0 | 0 | DOWN | Reading this channel. |
| 1 | 0 | UP (low power) | Quiescent (reading another channel). |
| 0 | 1 | UP (high power) | Writing this channel. |
| 1 | 1 | DOWN | Writing in another channel. |

As shown in the above table, it is understood that the read/write signal, when in the zero condition, is actually a read signal and the SELECT input in the zero condition actually performs a SELECT operation.

Figure 2:
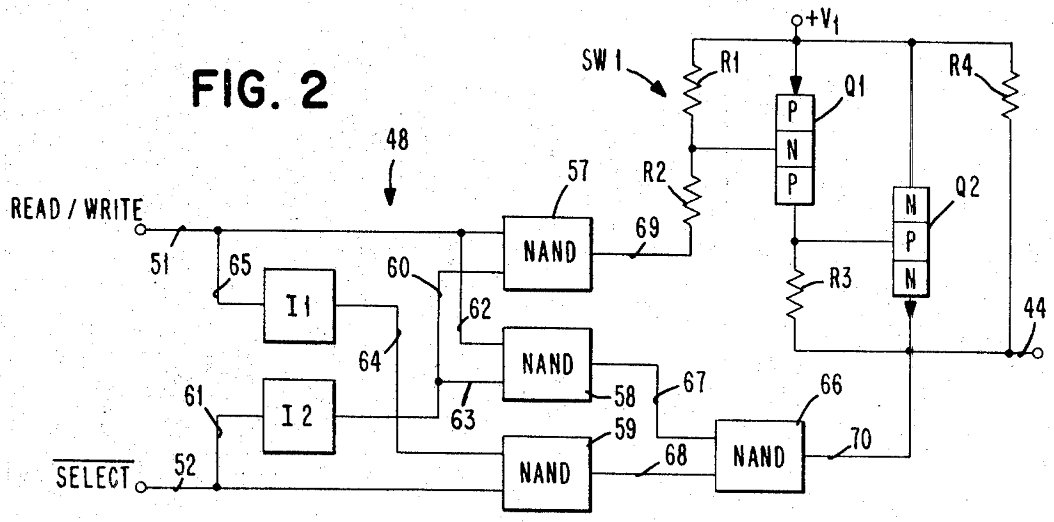
FIG. 2 illustrates a portion of the logic and electronic circuits operable for selecting one of the channels of the multiplexing system of FIG. 1.

A voltage switch operative to meet the above conditions is shown in FIG. 2. As illustrated, switch SW1 comprises a PNP transistor Q1 and an NPN transistor Q2 connected as illustrated to output 44. A low power up signal is provided on line 44 for application to the secondary of transformers 32 through 35 when transistors Q1 and Q2 are cut off. In that condition, the low power up signal essentially constitutes the voltage drop from power source $V_1$ across resistor R4 while at the same time the voltage level on line 70 is at some potential above ground. The high power up level for performing the write operation in the memory device is obtained by saturating transistors Q1 and Q2 so that virtually all the current from voltage source $V_1$ passes therethrough to output 44 whereby resistor R4 is shorted out. This condition is obtained by supplying a down signal to line 69 which is connected to the resistor R2 and an up signal on line 70 connected to the emitter output of transistor Q2. With a down signal on line 69, current from voltage source $V_1$ flows through resistors R1 and R2 causing a voltage to be applied to the base of transistor Q1 turning it on. This, in turn, causes transistor Q2 to be turned on and to become saturated. In this condition, transistor Q2 effectively constitutes a direct short across resistor R4 and virtually all of the power from source $V_1$ is applied to transistor Q2 and, due to the low resistance of transistor Q2, a very high current can be delivered to the output line 44 on demand. In accordance with Table I, voltage switch SW1 also is required to produce an output signal on line 44 which is down. This is obtained by grounding the line 70 thereby grounding the emitter of transistor Q2 and the output line 44. At the same time, an up signal is applied to resistor R2 on lead 69 to maintain transistors Q1 and Q2 in the cut off condition.

While various devices may be used to build a voltage switch of the type described, one arrangement uses a type 2N4209 transistor for Q1 and a type 2N3725 transistor for Q2, both manufactured by Fairchild Semiconductor. Resistors R1 and R2 are respectively 200 and 1000 ohms while resistors R3 and R4 are respectively 100 and 1000 ohms and $V_1$ is $\approx$12 volts.

The necessary input signals previously described for operating switch SW1 are provided by NAND gates 57 and 66 which are part of the logic gate 48. The details of NAND gate 57 are illustrated further in FIG. 3. As shown in that figure, NPN transistor Q3 has its collector connected to output line 69 while the emitter is connected to ground. The base of transistor Q3 is connected through series connected reverse poled diodes D17 and D18, lead 71, and resistor R5 to a positive voltage $V_2$. Input lines 51 and 60 are connected through reverse poled diodes D19 and D20, respectively, and through lead 71 and resistor R5 to lead voltage $V_2$. When two up voltage signals are applied to lines 51 and 60, current flows from source $V_2$ to transistor Q3 turning it on so that it becomes saturated and the potential which appears at the collector on line 69 is virtually ground level. When either of the lines 51 or 60 have a down signal, current flows from voltage source $V_2$ through the forward biased diode thereby cutting off transistor Q3. In that condition, the transistor Q3 is virtually an open circuit to the voltage switch SW1.

Referring again to FIG. 2, the logic arrangement for logic gate 48 will be described. In addition to the previously mentioned NAND gates 57 and 66, gate 48 includes NAND gates 58 and 59 having input connections on lines 62, 63, 64, 52, and 51, as shown. Inverters I1 and I2, connected by lines 65 and 61, respectively, to lines 51 and 52 provide inverted signals on lines 60 and 64 to NAND gate 57 and NAND gates 58 and 59. The outputs of the NAND circuits 58 and 59 are connected via lines 67 and 68 to the inputs of NAND circuit 66.

While various NAND gate circuits may be used for NAND gates 58 and 59, a preferred type is the SN–5400 marketed by Texas Instruments, Inc. and described in detail in their 1967–68 Integrated Circuits Catalog on page 1005.

Logic gate 48 operates in the following manner. With up signals applied to both lines 51 and 52, NAND gate 57 will have an up and down signal on lines 51 and 60 thereby providing an open circuit condition on line 69 to resistor R2 and switch SW1. At the same time, NAND gate 58 will have an up signal and a down signal on lines 62 and 63, respectively, to produce an up signal on line 67 to the input of NAND gate 66. Simultaneously, NAND circuit 59 has a down input signal on line 64 and an up input signal on line 52, thereby producing an up signal on line 68 to NAND gate 66. In this condition, as previously described, line 70 from NAND circuit 66 is grounded thereby providing a down signal on line 44.

Where the signal on line 51 is up and the signal on line 52 is down, NAND gate 57 grounds output line 69, thereby causing current flow from source $V_1$ in resistor R1 turning on transistor Q1. With transistor Q1 turned on, transistor Q2 becomes saturated and bypasses resistor R4 thereby providing a high current to the output circuit 44. At the same time, NAND circuit 58 is pulsed with two up signals on lines 62 and 63 causing a down signal on line 67 to NAND gate 66. Simultaneously, NAND circuit 59 is energized with down signals on lines 64 and 52 producing an up signal on lead 68 to NAND circuit 66. Since the NAND circuit 66 has a down signal at its one input, transistor Q3 is cut off and, in effect, lead 70 is an open circuit. Thus, an up signal on line 44 with high power condition is provided to write in the selected channel.

When both inputs on lines 51 and 52 are down, NAND gate 57 open circuits line 69 thereby maintaining the transistors Q1 and Q2 of switch SW1 in cut off condition. NAND circuits 58 and 59, however, will both seen down signals on lines 52 and 62 thereby producing up signals on both lines 67 and 68 to essentially ground line 70. In this condition, switch SW1 can be used for performing a read operation.

With the signal on line 51 down and up on line 52, NAND gate 57 provides an open circuit to line 69, thereby maintaining transistors Q1 and Q2 of switch SW1 in cut off condition. At the same time, NAND gate 58 produces an up signal on line 67 and NAND gate 59 provides a down signal on line 68. Thus, NAND circuit 66 maintains transistor Q3 in a cut off condition so that a virtual open circuit appears on line 70. In this condition, switch SW1 has an up signal on its output 44, however, the power level is low since the current flow from $V_1$ is through resistor R4.

While the preceding description relates to the details of voltage switch SW1 and gate 48, it is understood that the same details of structure and operation apply to the other voltage switches SW2 through SW4 and the logic gates 49 through 51.

Figure 3:
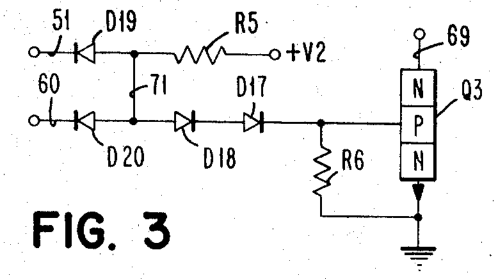
FIG. 3 shows one of the logic gates used in the logic circuitry of FIG. 2.

The operation of the multiplexing system of FIG. 1, with reference to FIG. 4, as well as FIGS. 2 and 3 will now be made.

In the read mode, the selected channel voltage switch is set to the down level in the manner previously described and the remaining voltage switches are set to the low power up level. As shown in FIG. 4, SW1 has its output signal 80 on line 44 to winding 34 of transformer 32 switched to the down level while the switches SW2, SW3, and SW4 have their voltage levels to windings 39, 41 and 43 of transformers 33–35, respectively, set to the up level as shown by curves 81, 82, and 83. This causes the read diodes D1 and D8 in channel conductors 16 and 23 to conduct while the remaining read diodes D2 through D4 and D5 through D7 become reverse biased. Any signal generated by voltage source E1 on bit-sense lines 24, 25, and appearing on windings 34 and 36 of transformer 32 will all be passed by read diodes D1 and D8 which, since they are conducting, are essentially low resistance elements, to appear across characteristic impedance Z0 at the input lines 14 and 15 to the sense amplifier 13. While in FIG. 1 the read signal sources are shown as voltage generators E1 through E4, it is understood that the read signal is generated from a word current $I_W$ applied to the word line of the memory device previously described and shown as curve 84 in FIG. 1. Thus, if the magnetic bit element of the memory device has a binary one stored therein, a one signal E1, as shown by curve 85, will be generated from the bit-sense lines 24, 25 through transformer 32 and read diodes D1 and D8 to the input lines 14 and 15 of sense amplifier 13. In the unselected channels, other data signals E2–E4 are also generated in their respective bit-sense lines and appear in the windings of their transformers 33–35. However, since the read diodes D2–D4 and D5–D7 are reverse biased by signals on lines 45–47 from switches SW2–SW4, no additional data signals will appear on lines 14–15 of sense amplifier 13.

In the write mode, the voltage switch SW1 is set to a high power up level, as previously described, and all other switches SW2 through SW4 are set to the down levels, assuming a bit is selected by logic 56 to be written in storage on bit lines 24 and 25.

Figure 4:
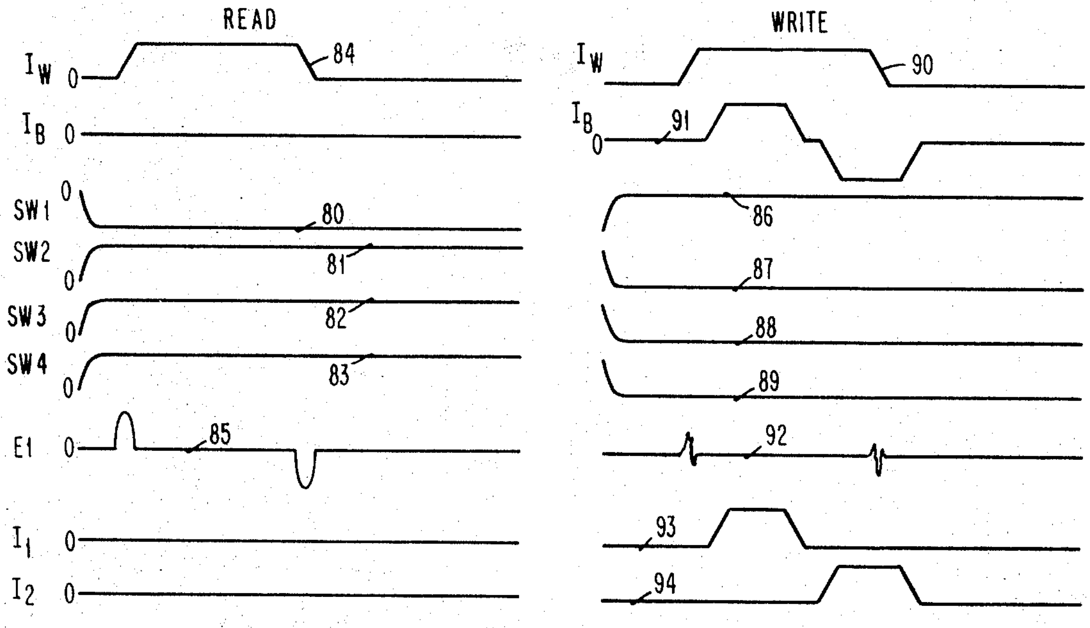
FIG. 4 is a wave diagram useful in explaining the operation of the invention illustrated by FIGS. 1–3.

As shown in FIG. 4, voltage switch SW1 is set to the high power up level while switches SW2 through SW4 are set to the down levels as illustrated by curves 86 through 89, respectively. This combination of switch operations reverse biases all the write diodes except for diodes D9 and D16. After the transients have subsided, write current $I_W$ in the word line of the memory device is generated as shown by curve 90 in FIG. 4. The bit current driver 10 is then operated to draw currents $I_1$ and $I_2$ from the voltage switch SW1 through the transformer winding 34 and through diode D9 and D16. In the illustration of FIG. 4, the bit current $I_B$ as shown by curve 91 is intended to be cycled in a positive and negative sense to perform switching of a magnetic bit element of the type described in the aforesaid application of A. W. Vinal, Ser. No. 693,-409, filed Dec. 26, 1967. The bipolar bit currents shown by curve 91 in FIG. 4, generated in the winding 36 of transformer 32 by operating the bit driver 10 to drive the write cycle in timed relation with the write pulse $I_W$ of curve 90 as illustrated in FIG. 4. The bipolar bit currents shown in FIG. 4 as curve 91 are generated in transformer 32 from unipolar bit driver current pulses $I_1$ and $I_2$ because of the sense of the transformer connections. It is important to note that during the write operation that the sense amplifier 13 sees the equivalent of three simultaneously selected read channels, as shown by curve 92 in FIG. 4. The information represented by curve 92 obviously is not meaningful and no attempt is made to show it accurately in the drawing; but, an important factor is that the sense amplifier 13 sees reasonable signal levels at this time and is effectively disconnected from the write driver 10.

While in illustrating the present invention, a bit current $I_B$ is shown having particular bipolar characteristics, it can also be of another characteristic depending on the memory device being used. Further, while read/write operations are illustrated for a particular channel, it is to be understood that read/write operations are performed in the same manner for the other channels. While the invention has been illustrated with a particular multiplexing arrangement for four channels, other numbers of channels may be used and the arrangement of FIG. 1 may be expanded to provide additional bit drivers and sense amplifiers for read/write operations in additional memory channels as the memory device size and configuration may require.

While the invention has been particularly shown and described with reference to a preferred embodiment thereof, it will be understood by those skilled in the art that various changes in form and details may be made therein without departing from the spirit and scope of the invention.

I claim:

1. A multiplexing system for a memory device or the like comprising in combination:
   driver means,
   sense amplifier means, and
   channel means for selectively coupling said driver means and sense amplifier means to data circuits of said memory device including
      a conductor network having plural channels interconnecting said driver and sense amplifier means,
      diode means in said conductor network and poled for blocking the transmission of data signals between said driver means, said sense amplifier means and said data circuits, transformer means for coupling data circuits of said memory device to said conductor network channels; and circuit means for conditioning said transformer means for selectively blocking and unblocking said diode means whereby said driver means and said sense amplifier are connected for reception and transmission of data signals from said data circuits.

2. A multiplexing system in accordance with claim 1 in which said transformer means comprises plural transformers having a first winding connected to an individual data circuit and a second winding connected to an individual channel of said conductor network, and said conditioning circuit means comprises switch circuits selectively operable to apply D–C biasing signals through said second windings of said transformers for blocking and unblocking said diode means.

3. A multiplexing system in accordance with claim 2 in which said data circuits are bit-sense lines and said driver means is a bit current driver circuit and said conditioning means comprises a switch circuit connected to the center tap of said second winding of said transformers.

4. A multiplexing system in accordance with claim 3 in which said switch circuits of said conditioning circuit means are selectively operable to apply up and down level D-C biasing signals through said second windings of said transformers.

5. A multiplexing system in accordance with claim 4 in which said switch circuits are further selectively operable to provide a high power current in combination with one of said up signals.

6. A multiplexing system in accordance with claim 5 in which said switch circuits are selectively operable to apply high and low power signals in combination with an up D-C biasing signal and a down level signal to selectively perform read/write operations in said data circuits of said memory device.

7. A multiplexing system in accordance with claim 6 in which said diode means comprises read and write diodes in said channels of said network, said read diodes being poled to block up level D-C voltage and high power current signals from said switch circuits, and said write diodes being poled to pass high power currents from said second winding of said transformer to said bit driver circuit.

References Cited

UNITED STATES PATENTS 3,425,044 1/1969 Ferrier et al.

JAMES W. MOFFITT, Primary Examiner